(12) United States Patent
Liu

(10) Patent No.: US 7,464,734 B2
(45) Date of Patent: Dec. 16, 2008

(54) SELF-COOLING PIPELINE SYSTEM AND METHOD FOR TRANSFER OF CRYOGENIC FLUIDS

(76) Inventor: Xuejie Liu, 12518 Boheme Dr., Houston, TX (US) 77024

( * ) Notice: Subject to any disclaimer, the term of this patent is extended or adjusted under 35 U.S.C. 154(b) by 386 days.

(21) Appl. No.: 11/311,073

(22) Filed: Dec. 19, 2005

(65) Prior Publication Data
US 2007/0029008 A1 Feb. 8, 2007

Related U.S. Application Data (60) Provisional application No. 60/706,349, filed on Aug. 8, 2005.

(51) Int. Cl.
F17C 7/04 (2006.01)
F17C 13/00 (2006.01)
F17C 1/00 (2006.01)
F17C 9/02 (2006.01)
F25J 1/00 (2006.01)

(52) U.S. Cl. .............................. 141/82; 141/5; 141/45; 141/290; 62/606; 62/48.1; 62/50.7; 62/53.1

(58) Field of Classification Search .................. 141/4, 141/5, 82, 44, 45, 279, 59, 236, 285, 290; 62/48.1, 48.2, 50.7, 53.1, 606, 611
See application file for complete search history.

(56) References Cited

U.S. PATENT DOCUMENTS

| | | | | |
|---|---|---|---|---|
| 4,315,408 A | * | 2/1982 | Karl | 141/388 |
| 4,826,354 A | * | 5/1989 | Adorjan | 405/158 |
| 5,403,121 A | * | 4/1995 | Lanan | 405/166 |
| 5,996,649 A | * | 12/1999 | Sutton et al. | 141/59 |
| 6,012,292 A | | 1/2000 | Gulati et al. | |
| 6,244,053 B1 | | 6/2001 | Gulati et al. | |
| 6,289,945 B1 | * | 9/2001 | Haboush, II | 141/59 |
| 7,080,673 B2 | * | 7/2006 | Pollack et al. | 141/387 |

(Continued)

FOREIGN PATENT DOCUMENTS
WO WO2005/059432 * 6/2005

(Continued)

OTHER PUBLICATIONS

Tarlowski, J., Sheffield, J., Durr, C., Coyle, D. and Patel, H. , "LNG Import Terminals—Recent Developments," http://www.cheresources.com/lng_terminals.pdf Online Chemical Engineering Information, Date unknown, A total pages of 19.

(Continued)

Primary Examiner—Timothy L Maust
Assistant Examiner—Nicolas A Arnett (57) ABSTRACT

A system for transfer of cryogenic fluids and a method to keep the system at cryogenic temperatures during non-transfer periods requires an insulated transfer pipe that is inclined with a high end at a storage tank, a transfer jumper extending from the high end to the vapor area of the tank and a feeding line fluidly connecting to the high end also. During idle periods, the cryogenic liquid is fed from the storage tank into the transfer pipe to compensate the liquid that vaporizes in the transfer pipe due to heat leakage from the surroundings. The fed liquid flows down by gravity, and the boil-off gas flows back to the storage tank along the top of the transfer pipe and through the transfer jumper. As a result, the transfer system is kept at cryogenic temperatures.

20 Claims, 5 Drawing Sheets

U.S. PATENT DOCUMENTS

2007/0095427 A1* 5/2007 Ehrhardt et al. ............. 141/387

OTHER PUBLICATIONS

Zapke, A. and Kroger, D. (2000), "Countercurrent Gas-Liquid Flow in Inclined and Vertical Ducts—I: Flow Patterns, Pressure Drop Characteristics and Flooding," International Journal of Multiphase Flow, vol. 26 (2000), pp. 1439-1455., Elsevier Science Ltd., www.elsevier.com/locate/ijmulflow, International.

Lee, S. and Bankoff, S. (1983), "Stability of Steam-Water Countercurrent Flow in an Inclined Channel: Flooding," Journal of Heat Transfer, Nov. 1983, vol. 105. pp. 713-718, American Society of Mechanical Engineers, U.S.A.

* cited by examiner

A Self-Cooling Pipeline System and Method for Transfer of Cryogenic Fluids

SELF-COOLING PIPELINE SYSTEM AND METHOD FOR TRANSFER OF CRYOGENIC FLUIDS

CROSS-REFERENCE TO RELATED APPLICATIONS

This application claims priority of U.S. Provisional Patent Application Ser. No. 60/706,349 filed on Aug. 8, 2005.

| U.S. PAT. DOCUMENTS | | | |
|---|---|---|---|
| 6012292 | 1/2000 | Gulati and Silverman | 62/50.7 |
| 6244053 | 6/2001 | Gulati, et al. | 62/50.1; 62/50.7 |

OTHER PUBLICATIONS

Tarlowski, J., Sheffield, J., Durr, C., Coyle, D. and Patel, H., "LNG Import Terminals—Recent Developments," http://www.cheresources.com/lng_terminals.pdf Zapke, A. and Kroger, D. (2000), "Countercurrent Gas-Liquid Flow in Inclined and Vertical Ducts—I: Flow Patterns, Pressure Drop Characteristics and Flooding," International Journal of Multiphase Flow 26 (2000), pp 1439-1455.

Lee, S. and Bankoff, S. (1983), "Stability of Steam-Water Countercurrent Flow in an Inclined Channel Flooding," Journal of Heat Transfer, November 1983, Vol. 105.

STATEMENT REGARDING FEDERALLY SPONSORED RESEARCH OR DEVELOPMENT

Not Applicable

BACKGROUND OF THE INVENTION

1. Field of Invention

The present invention relates generally to a system and method for transfer of cryogenic fluids at a loading/unloading terminal. Specifically, the present invention provides a circulation loop within a single large size and inclined pipe to keep the system at/near cryogenic temperatures during idle periods between two consecutive transfer operations.

2. Description of the Related Art

Demand for natural gas is rising in developed countries but more natural gas is found in remote areas. To connect gas consumers and resources, one of the economically feasible methods is to liquefy the natural gas at −163° C. and then to transport the liquefied natural gas (LNG) with LNG tankers. In this LNG chain, LNG needs to be loaded into LNG tankers from onshore liquefaction plants at loading terminals near production fields and unloaded into onshore LNG storage at receiving terminals near consumers. The onshore storage tank is maintained at −163° C. and at a regular pressure (e.g. no more than 1.2 atmosphere pressure). Typically, a LNG tank is a full-containment type with vapor contained by outer concrete cylinder and roof LNG is stored in the inner tank typically made of stainless steel or nickel steel to a certain level leaving the space above for boil-off gas (i.e. vapor). Any vapor generated due to heat leakage through the tank wall/roof and transfer pipeline system flows into a gas pipe with intake level located above the maximum liquid level of the storage tank. The vapor is then compressed and typically sent to re-condenser.

LNG tankers are sea-going vessels and require a water depth of 15 m or more for docking and moving. Therefore, transferring LNG between onshore facilities and LNG tankers require a transfer system in a length varying from hundreds to thousands of meters depending on the seabed profile. Above-water pipeline systems for cryogenic fluid transfer at loading/receiving terminals are widely used along with supporting structures such as jetty or trestle. Underwater systems are also proposed but only a few are built (e.g. transfer pipes located in an underground tunnel at the Cove Point receiving terminal in Maryland).

Typically, un-loading a LNG tanker takes about 12 hours and un-loading frequency is around twice per week. In order to avoid repeatedly heating/cooling which leads to early failure of the transfer system, it is required to keep the system at cryogenic temperatures during those internals between transfer operations. A conventional method is to have a separated LNG line (i.e., a small size recirculation line) that runs from the onshore storage tank to an offshore un-loading deck. During idle periods at a receiving terminal, a small amount of LNG is diverted into the recirculation line from LNG discharge pipe of the storage tank. This LNG flows to an offshore loading header and returns to the storage tank through the main transfer pipe. Boil-off gas appears after pressurized LNG is released from the circulating system into the tank in low pressure (e.g. 1 bar). This recirculation line may also be designed at an identical size as the transfer pipe, and both pipes serve as transfer lines during unloading operation.

In the conventional transfer system, both transfer pipe and recirculation line have their own insulation and water-proof outer shield. In the attempt to improve the system, U.S. Pat. No. 6,012,292 to Gulati and Silverman disclosures a system in which a small size recirculation line is positioned inside a transfer pipe. During idle periods, the cryogenic fluid is circulating through the recirculation line and the annulus between the transfer pipe and recirculation line. U.S. Pat. No. 6,244,053 to Gulati et al disclosures a system and method in which the transfer system is circulating single phase LNG at high pressure within a closed piping loop along with a heat exchanger for heat reduction.

BRIEF SUMMARY OF THE INVENTION

The present invention provides a system and method for transferring cryogenic fluids at a loading/unloading terminal. The transfer system requires only one large size transfer pipe encased by thermal insulation. This transfer pipe is inclined with lower elevations toward an offshore loading deck, allowing cryogenic liquid flowing down by gravity and boil-off gas flowing backwards along the top of the pipe to form a circulation loop within the pipe and to keep the system at cryogenic temperatures during idle periods (i.e. no transfer of cryogenic fluids).

The transfer system basically comprises an inclined transfer pipe, a transfer jumper extending from the high end of the transfer pipe to the vapor area of the storage tank onshore and a feeding line fluidly connecting the same end of the transfer pipe to the liquid area of the storage tank. In addition, pumps and/or valves are used along the feeding line to feed cryogenic liquid from the storage tank to the transfer pipe at desirable flow rates during an idle period and commissioning. The transfer pipe can be either supported on trestle/jetty, or laid on seabed, or buried in seabed.

After the transfer operation, boil-off gas starts to appear at the top of the transfer pipe due to heat leakage from the surroundings and pushes some of liquid in the transfer system back to the storage tank. The system is maintained at/near cryogenic temperatures for a period of time (e.g. 5 hours) by continuous phase change from liquid to vapor that consumes the heat. The boil-off gas automatically flows to the storage tank along the top of the transfer pipe and the transfer jumper. Thereafter, cryogenic liquid from the storage tank is fed into the transfer pipe at a rate preferably equal to the amount of liquid vaporizing in the system.

Advantages of the system include reducing construction costs, minimizing operation costs and maintenance, and greatly enhancing the safety for transfer of cryogenic fluids at receiving/loading terminals.

BRIEF DESCRIPTION OF THE DRAWINGS

The system, method and advantages of the present invention will be better understood by referring to the drawings, in which:

FIG. 8 shows orientation of an expansion loop in accordance with the present invention, in which

DETAILED DESCRIPTION OF THE PREFERRED EMBODIMENT

Figure 1:
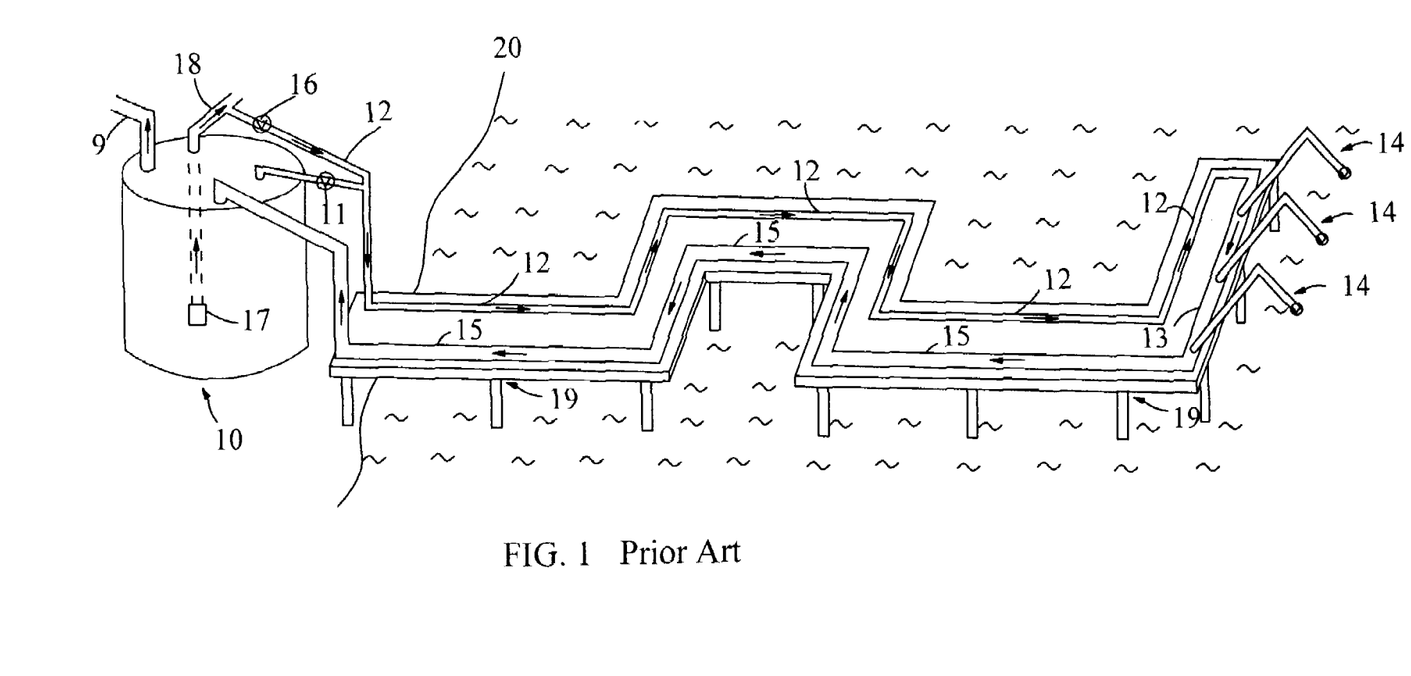
FIG. 1 is an overview of a typical transfer system at a receiving terminal wherein LNG is circulating through two separated pipelines during idle periods in a prior art.

FIG. 1 illustrates a typical transfer system at a LNG receiving terminal in a prior art. Storage tank 10 is located onshore near coast line 20. Loading arms 14 are located offshore at a water depth of 15 m or more that is required for docking a typical LNG tanker. Loading header 13 is connected to loading arms 14. Two LNG lines 12 and 15 are connected to tank 10 at the onshore end and loading header 13 at the offshore end. Both LNG lines 12 and 15, loading header 13 and loading arms 14 are above seawater and supported on trestle 19. Exit pipe 9 is connected to tank 10 through its roof. The exit pipe 9 is a part of a vapor handling system (not shown) for exit of boil-off gas in tank 10. First stage pump 17 is located near the bottom of tank 10 and sending out LNG through discharge pipe 18. LNG line 12 also connects to discharge pipe 18 along with valve 16. During an idle period, valve 11 is closed and valve 16 is opened. A small portion of LNG from discharge pipe 18 flows into LNG line 12. This LNG then passes through loading header 13 and flows back to tank 10 through LNG line 15 in the directions as indicated in FIG. 1. Both lines 12 and 15 are maintained at cryogenic temperatures during idle periods through the circulation of LNG. During unloading operation, open valve 11 and close valve 16. LNG flows from loading arms 14 into tank 10 through both LNG lines 12 and 15. For simplicity, additional piping extended to the tank bottom to provide bottom filling of fluids in tank 10 is not shown.

Figure 2:
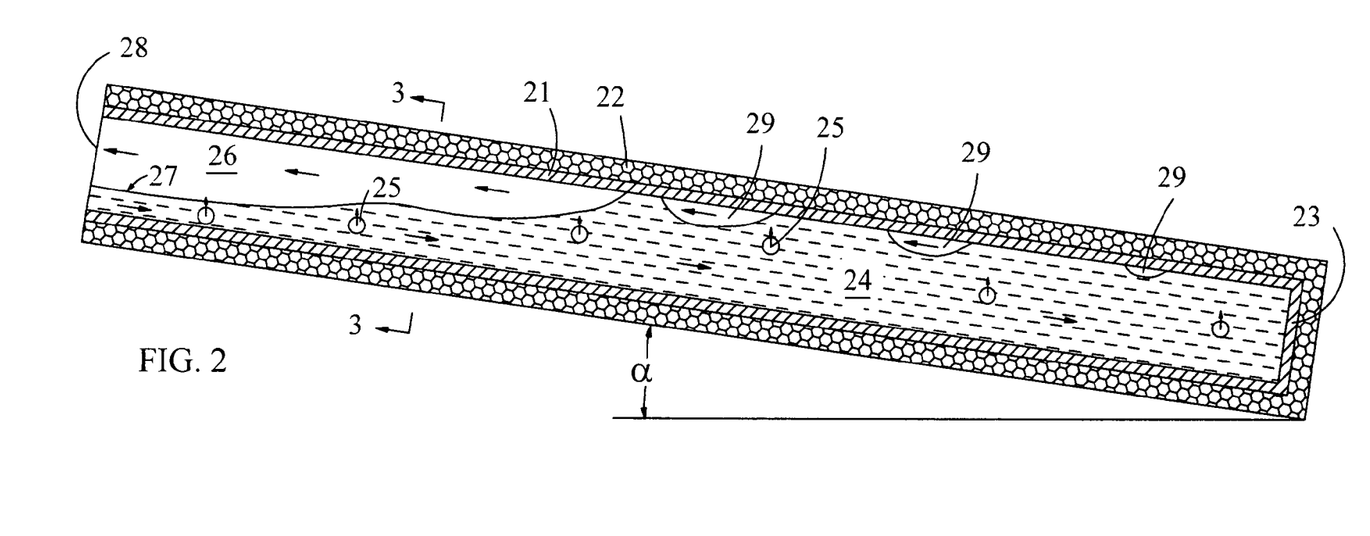
FIG. 2 is a section view of an inclined transfer pipe along with a circulation loop within to illustrate the principal of the present invention.

FIG. 2 illustrates the principle of this invention. A transfer pipe 21 is oriented with an inclination angle, a (e.g. 2°). In this illustration, the lower end of transfer pipe 21 is closed with a cap 23 and its high end 28 is kept open. Transfer pipe 21 is encased with insulation 22. On high end 28, LNG is fed into transfer pipe 21 and flows down transfer pipe 21 by gravity along the bottom of the pipe. Small gas bubbles 25 generate from LNG 24 by consuming heat leaking into transfer pipe 21. Around the closed end, elongated bubbles 29 are forming by accumulation of small gas bubbles 25 at the top of transfer pipe 21, and moving towards high end 28. Around open end 28, boil-off gas 26 (i.e., vapor) occupies the upper space of transfer pipe 21 and also moves towards high end 28. The pressure difference created by phase change continues to drive the boil-off gas flowing towards high end 28. As a result, a circulation loop is formed by LNG flowing downward into transfer pipe 21 along the bottom of the pipe and generated gas flowing backward along the top of the same pipe in a countercurrent two-phase flow.

Figure 3:
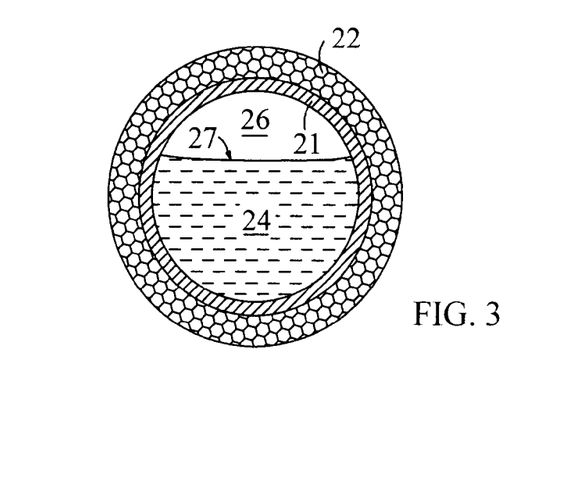
FIG. 3 is a cross-section view taken along line 3-3 of FIG. 2.

FIG. 3 shows a cross-section view of transfer pipe 21 taken from line 3-3 of FIG. 2, in which the lower portion of the cross-section is occupied by LNG 24 and the upper portion of the cross-section is occupied by boil-off gas 26 with an interface 27. The flow rate of boil-off gas has a maximum value at open end 28 (i.e. total volume of boil-off gas inside transfer pipe 21 per unit time) and is gradually reduced to a minimum value (i.e. 0) at the lower end.

In order to keep transfer pipe 21 at cryogenic temperatures, there are several requirements. Firstly, transfer pipe 21 is inclined with a slope angle no less than 0.01° so that the LNG can flow down by gravity. Secondly, LNG is fed in small amount and only occupies the lower portion of the cross-section area at the entry point (i.e., open end 28) of transfer pipe 21, leaving the upper space available for boil-off gas to flow backwards. Thirdly, transfer pipe 21 is well insulated (e.g. an Overall Heat Transfer Coefficient (OHTC) of 0.5 $Wm^{-2}K^{-1}$ or less) and the flow of boil-off gas would not cause flooding (i.e. preventing LNG from flowing in).

The amount of boil-off gas depends on the diameter, length and OHTC of transfer pipe 21. The total heat leakage per unit time is:

$$H=U(\pi DL)(T_O-T) \quad (1)$$

where H is the total heat leaking into transfer pipe 21 from surroundings, D is the inner diameter of transfer pipe 21, U is the overall heat transfer coefficient (OHTC) based on the inner diameter of transfer pipe 21, L is the length of transfer pipe 21, $T_O$ is the average ambient temperature and T is the temperature of LNG inside transfer pipe 21.

The amount of boil-off gas is determined based upon the amount of heat leakage that is consumed by vaporization of LNG. The enthalpy of vaporization is E=8.17 kJ/mol for LNG.

Inside transfer pipe 21, the amount of gas vaporizing per unit time, n, in moles, can be calculated by:

$$n=H/E \quad (2)$$

The corresponding gas volume generating per unit time, V, can be calculated by:

$$V = nRT/P \quad (3)$$

where R is the ideal gas law constant, and P is the gas pressure in transfer pipe 21.

The gas velocity can be calculated by the amount of boil-off gas per unit time divided by the cross-section area for gas flow. The velocity of gas flowing out of transfer pipe 21 is:

$$v_G = \frac{4UL(T_O - T)RT}{(1-h)EDP} \quad (4)$$

where $v_G$ is the gas velocity at open end 28 and h is the LNG hold-up at open end 28.

The desirable feeding rate of LNG at high end 28 of transfer pipe 21 is determined by:

$$F = 16n/\gamma \quad (5)$$

where F is the desirable feeding rate of LNG at open end 28 of transfer pipe 21 and γ is the density of LNG.

Figure 4:
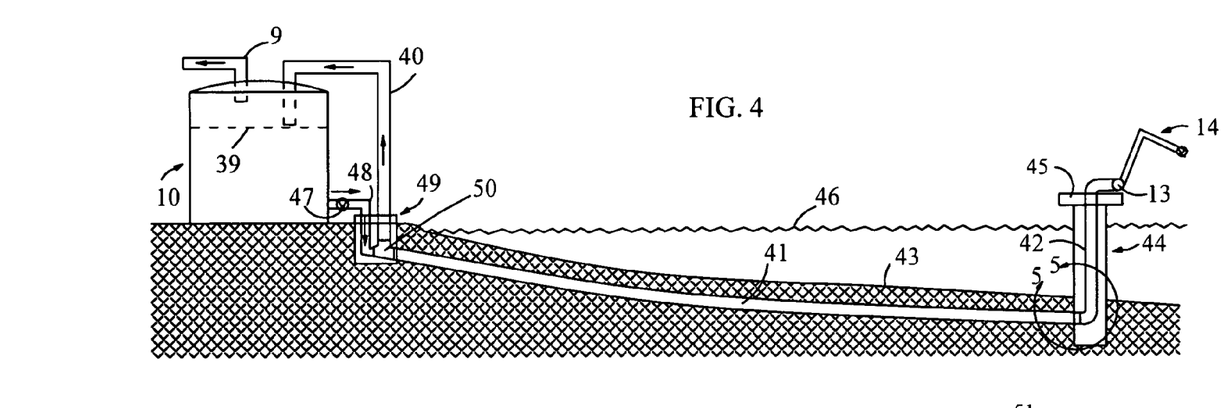
FIG. 4 shows a subsea transfer system in accordance with the present invention and flow directions around the storage tank during idle periods at a receiving terminal.

FIG. 4 shows an embodiment of this invention, in which insulated transfer pipe 41 extends from shallow shaft 49 near tank 10 all the way to offshore shaft 44 above which loading deck 45 and loading header 13 are located. Transfer pipe 41 is encased by a steel outer pipe for protection and buried in seabed 43. Following generally the natural contour of seabed 43, transfer pipe 41 gradually lowers its elevation as it extends towards offshore shaft 44 with a relatively higher inclination angle (e.g. 2°) around the onshore end and a lower inclination angle (e.g. 0.2°) around the offshore end. At the offshore end of transfer pipe 41, shaft 44 is anchored into seabed 43 at a seawater depth of 15 m or more and extends vertically above sea-water level 46. Shaft 44 is used to house transfer riser 42 which is connected to loading header 13. At the onshore end of transfer pipe 41, shallow shaft 49 is used to house tee 50 connecting transfer pipe 41 to transfer jumper 40 and feeding line 48. Transfer jumper 40 has the same size as transfer pipe 41 and is also insulated. Transfer jumper 40 goes through the roof of tank 10 and ends above max LNG level 39. Feeding line 48 is in a small size and connects to the lower sidewall of tank 10.

During an unloading operation, LNG is transferred through loading header 13, transfer riser 42, transfer pipe 41 and transfer jumper 40 to tank 10. Right after unloading operation, the boil-off gas starts to push the LNG inside transfer jumper 40 into tank 10 on the onshore end. After a period of time (preferably after the liquid in transfer jumper 40 is consumed by vaporization in the transfer system), open valve 47 and let LNG flow into transfer pipe 41 by gravity. In the meantime, boil-off gas generated inside transfer pipe 41 flows back to tank 10 along the top of transfer pipe 41 and transfer jumper 40. The boil-off gas entered tank 10 is then flowing out through exit pipe 9 of a vapor handling system that is required at a receiving LNG terminal.

Figure 5A:
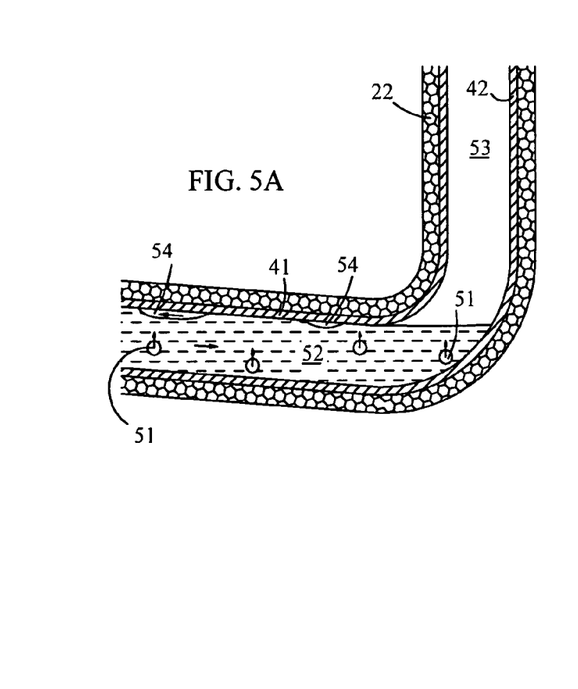
FIG. 5A shows the flow pattern around the lowest location of the subsea system taken along line 5-5 of FIG. 4 for one-way gas flow during idle periods.
Figure 5B:
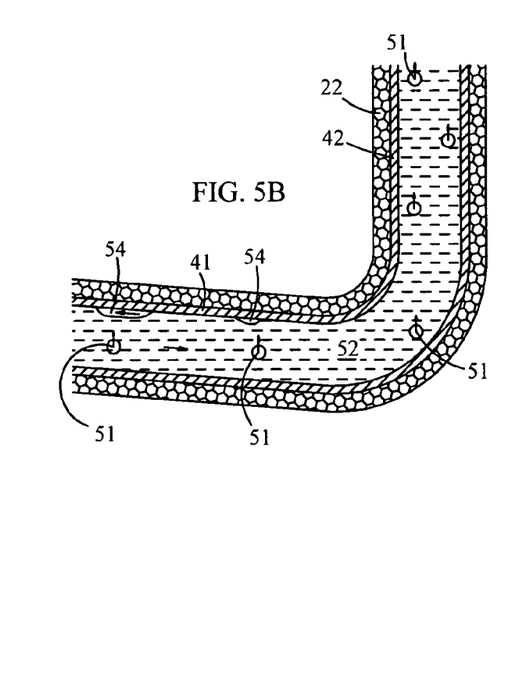
FIG. 5B shows the flow pattern around the lowest location of the subsea system taken along line 5-5 of FIG. 4 for two-way gas flow during idle periods.

FIG. 5A shows the flow pattern around the lowest location of transfer pipe 41 taken from line 5-5 of FIG. 4. After unloading operation, the boil-off gas will soon occupy transfer riser 42 and fill space 53 and pushes LNG down to the bottom of transfer riser 42. Small gas bubbles 51 float upwards, and elongated bubbles 54 are formed at the top of transfer pipe 41 and moving towards tank 10. The rest of transfer pipe 41 is occupied by LNG 52 around the offshore end. After transfer riser 42 is full of boil-off gas, its temperature increases as the heat leakage continues. In order to avoid the temperature increase in transfer riser 42 and the piping above, the end of loading header 13 in a variation of this embodiment is connected to a vapor return line (i.e. 62 in FIG. 6) that is typically installed at a receiving terminal. In this case, the boil-off gas around shaft 44 flows ashore through the vapor return line (i.e. 62 in FIG. 6). FIG. 5B shows the movement of gas and liquid around the lowest location of transfer pipe 41 during an idle period. LNG 52 now also occurs in transfer riser 42. Small gas bubbles 51 in transfer pipe 41 float upwards and lead to the formation of elongated bubbles 54 at the top of transfer pipe 41. The elongated bubbles 54 flow to tank 10 along the top of transfer pipe 41. In the meantime, small gas bubbles 51 in transfer riser 42 float upward and form single phase gas above LNG 52 in transfer riser 42.

Figure 6:
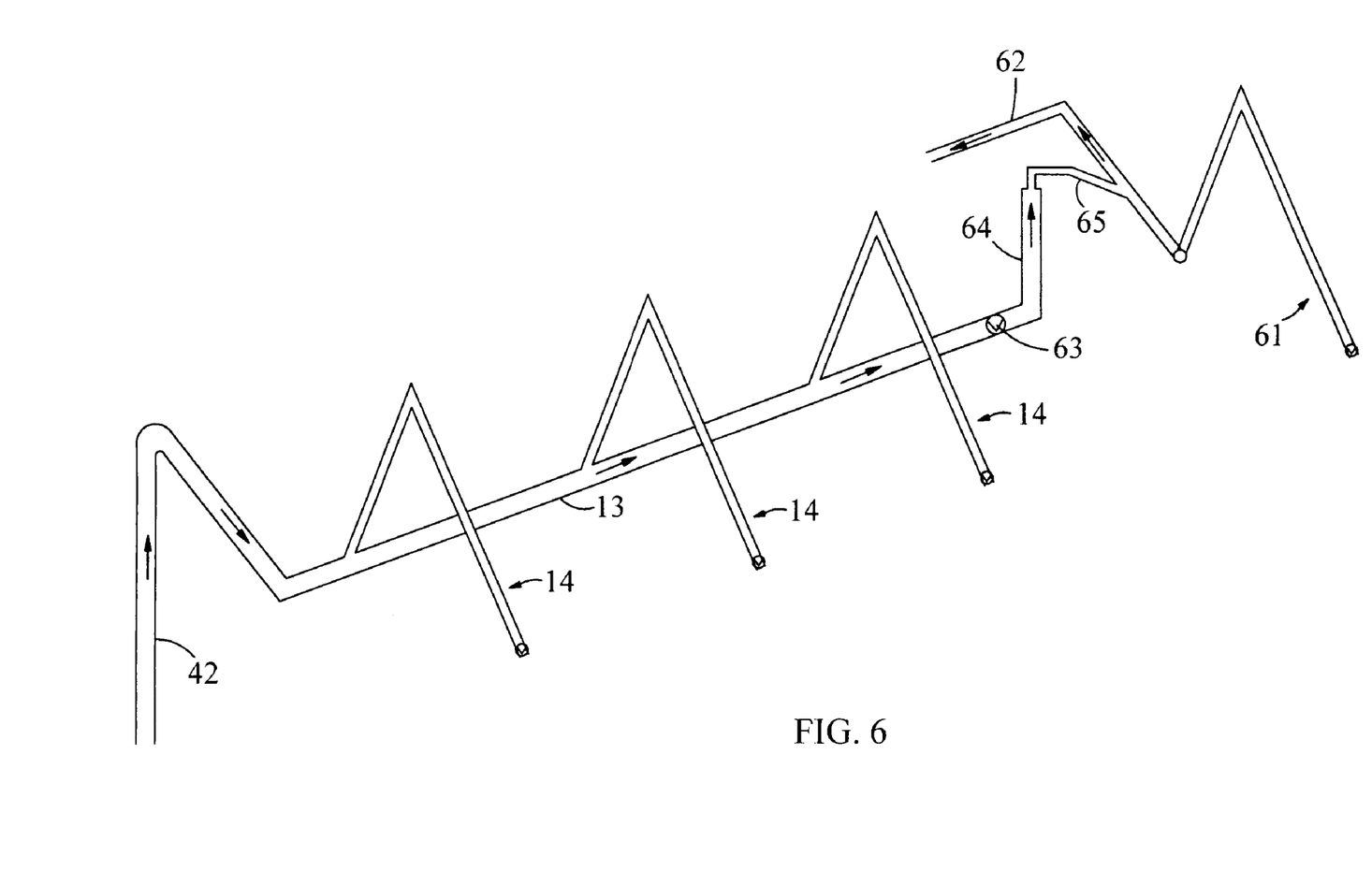
FIG. 6 shows the piping at the offshore unloading deck that ties in a loading header to a vapor return line, illustrating a variation of the system of FIG. 4.

FIG. 6 shows the piping on offshore deck 45. In addition to loading header 13 and loading arms 14 for LNG, there are vapor loading arm 61 and vapor return line 62. Loading header 13 is connected to transfer riser 42 at one end and the other end is connected to valve 63 followed by vertical spool 64 and extension 65. Extension 65 is connected to vapor return line 62. Loading header 13 preferably has an upward slope toward valve 63 in this variation. Right after unloading operation, boil-off gas quickly occupies loading header 13. Thereafter, open valve 63 and allow only gas to flow into vapor return line 62. The direction shown in FIG. 6 is for the flow of gas during a stable idle period. Vertical spool 64 is used to prevent any LNG from entering vapor return line 62.

Figure 7:
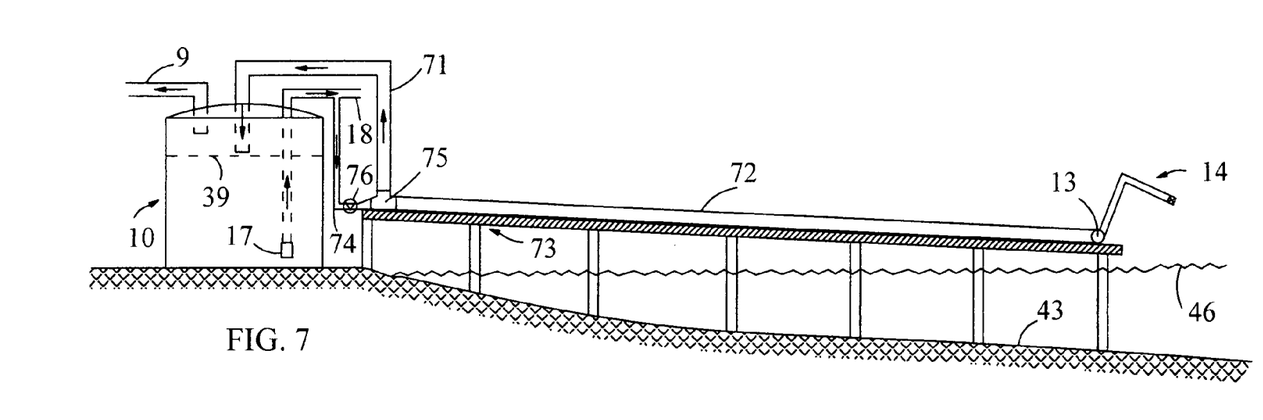
FIG. 7 shows a transfer system supported on trestle and flow directions around the storage tank during idle periods, as another embodiment of the present invention.

FIG. 7 shows another embodiment of this invention. In this case, transfer pipe 72 is above water level 46 and supported on trestle 73. Transfer pipe 72 is slightly inclined with its lowest location at loading header 13 (e.g. an inclination angle of 0.2° around the onshore end and 0.02° around the offshore end). The onshore end of transfer pipe 72 is connected to both transfer jumper 71 and feeding line 74 with tee 75, in which transfer jumper 71 uses the port facing up. Transfer jumper 71 goes through the roof of tank 10 and ends in the vapor area (i.e. above the maximum LNG level 39). The other end of feeding line 74 is connected to LNG discharge pipe 18 that runs through the roof of tank 10 and ends near the tank bottom with pump 17. After the unloading operation, boil-off gas starts to appear at the top of transfer pipe 72 and moves towards tank 10. The transfer system is maintained at/near cryogenic temperatures for a period of time (e.g. 5 hours) by the phase change from liquid to vapor. After transfer jumper 71 is full of boil-off gas, open valve 76 and let a controlled amount of LNG flow into transfer pipe 72 through feeding line 74. By gravity, this LNG flows down transfer pipe 72 and compensate the LNG that vaporizes inside. In the meantime, boil-off gas flows back to tank 10 along the top of transfer pipe 72 and transfer jumper 71. During unloading operation, valve 76 is closed and LNG flows from loading arms 14 to tank 10 through transfer pipe 72 and transfer jumper 71.

Figure 8A:
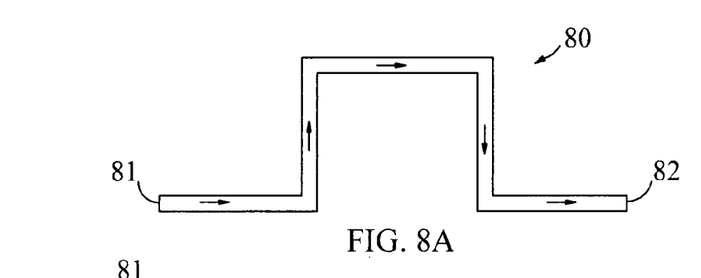
FIG. 8A is plan view.
Figure 8B:
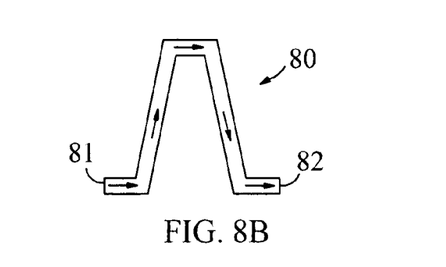
FIG. 8B is the elevation looking from the offshore unloading deck to the onshore tank.
Figure 8C:
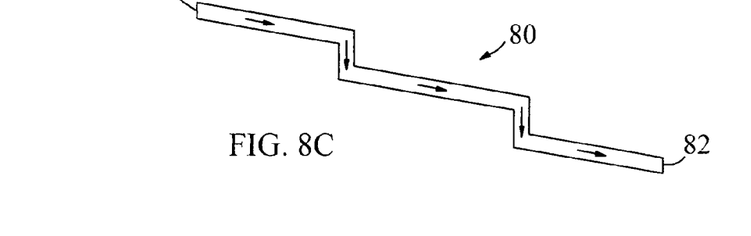
FIG. 8C is the elevation view from front.

When 9% nickel steel or the like is used for transfer pipe 72 in FIG. 7, expansion loops may be built into transfer pipe 72 at desired locations in order to accommodate high thermal stresses in the pipe. FIG. 8 shows the orientation for an expansion loop 80, in which high end 81 is on the onshore tank side while low end 82 is on the offshore loading header side. In this case, each leg of expansion loop 80 needs to be inclined in downward slope towards loading header 13 so that LNG can flow through the expansion loop by gravity in the direction as indicated in FIG. 8.

I claim:

1. A system for transferring cryogenic fluids at a loading/unloading terminal, said system comprising:
    a storage tank which has a vapor area and a vapor outlet above a liquid area;

an insulated and inclined transfer conduit with a high end at said storage tank;

transfer jumper extending from said high end to said vapor area of said storage tank above a predetermined maximum liquid level;

a feeding line fluidly connecting said high end to said liquid area of said storage tank for feeding said cryogenic liquid into said transfer conduit during non-transfer periods said system being kept at cryogenic temperatures by vaporization of cryogenic liquid during said non-transfer periods.

2. The transfer system of claim 1 wherein said transfer jumper and said feeding line are joined to said high end of said transfer conduit by a tee, and said transfer jumper uses the port of the tee facing up.

3. The transfer system of claim 1 wherein said transfer conduit comprising one or more thermal expansion loops oriented in upward slopes towards said high end, allowing cryogenic liquid flowing through said expansion loops by gravity.

4. The transfer system of claim 1 wherein said feeding line goes through a side wall of said storage tank near the tank bottom, together with a valve to control the flow of cryogenic liquids driven by gravity.

5. The transfer system of claim 1 wherein said feeding line is a jumper which extends down to said liquid area near the tank bottom and ends with a pump to control the feeding rate.

6. The transfer system of claim 1, wherein said feeding line extends from said high end to a discharge piping of said cryogenic liquid with a valve to control the feeding rate.

7. The transfer system of claim 1, wherein said transfer conduit is located above sea level.

8. The transfer system of claim 1, wherein said transfer conduit is located in an underground tunnel.

9. The transfer system of claim 1, wherein said transfer conduit is encased by an outer steel pipe that is buried.

10. The transfer system of claim 1, wherein said transfer conduit is encased by an outer steel pipe that is laid on the seabed.

11. The transfer system of claim 1, further comprising a loading header fluidly connecting a low end of said transfer conduit to loading arms on an offshore deck.

12. The transfer system of claim 11, further comprising, transfer riser extending from said low end of said transfer conduit to said loading header on said offshore deck;

spools and at least one valve that tie-in an end of said loading header to a vapor return line.

13. A method of keeping an insulated transfer conduit of cryogenic fluids at cryogenic temperature during non-transfer periods by vaporization of cryogenic liquid, said method comprising:

designating a vapor area and a vapor outlet above a liquid area in a storage tank;

orientating said transfer conduit inclined with a high end near said storage tank;

fluidly connecting said high end of said transfer conduit to said vapor area of said storage tank with a transfer jumper;

fluidly connecting said high end of said transfer conduit to a feeding line;

feeding said cryogenic liquid into said high end of said transfer conduit, wherein fed liquid flows down by gravity and vapor flows back to said storage tank along the top of said transfer conduit and through said transfer jumper.

14. The method of claim 13 further comprising:

fluidly connecting a low end of said transfer conduit to a vapor return line with a transfer riser, loading header and valve at a loading/unloading deck offshore;

keeping said valve open, wherein vapor from said transfer riser flows ashore through said vapor return line.

15. The method of claim 13 comprising feeding more said cryogenic liquid than that vaporizing inside said transfer conduit per unit time due to heat leakage from surroundings during commissioning.

16. The method of claim 13 further comprising controlling the feeding rate of said cryogenic liquids to compensate for the liquid that vaporizes inside said transfer conduit per unit time due to heat leakage from surroundings during said non-transfer periods.

17. The method of claim 13 further comprising letting said cryogenic liquid inside said transfer conduit vaporize right after loading operation and keeping said transfer conduit at or near cryogenic temperature for a period of time.

18. The method of claim 13 further comprising feeding said cryogenic liquid from said storage tank into said transfer conduit after said transfer jumper is full of vapor following a loading operation.

19. The method of claim 13 further comprising feeding said cryogenic liquids into said transfer conduit by gravity with said feeding line.

20. The method of claim 13 wherein feeding rate of said cryogenic liquids into said transfer conduit is controlled by means selected from the group consisting of a valve, pump, and size of said feeding line.

* * * * *